United States Patent
Mollov

(10) Patent No.: US 9,500,752 B2
(45) Date of Patent: Nov. 22, 2016

(54) PIXEL ARCHITECTURE FOR IMAGING DEVICES

(71) Applicant: Varian Medical Systems, Inc., Palo Alto, CA (US)

(72) Inventor: Ivan Mollov, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 14/474,660

(22) Filed: Sep. 2, 2014

(65) Prior Publication Data

US 2015/0085988 A1 Mar. 26, 2015

Related U.S. Application Data

(60) Provisional application No. 61/882,840, filed on Sep. 26, 2013.

(51) Int. Cl.
*H01L 27/146* (2006.01)
*G01T 1/20* (2006.01)

(52) U.S. Cl.
CPC .................. *G01T 1/2018* (2013.01)

(58) Field of Classification Search
CPC ................................ H01L 27/14609
See application file for complete search history.

(56) References Cited

U.S. PATENT DOCUMENTS

2002/0064254 A1* 5/2002 Aoki et al. .................... 378/98.7
2002/0158974 A1* 10/2002 Udo et al. ..................... 348/241
2005/0072901 A1* 4/2005 Funakoshi et al. ........ 250/208.1
2005/0174612 A1 8/2005 Sugiyama et al.
2005/0185078 A1* 8/2005 Segura-Puchades ......... 348/308
2007/0188639 A1* 8/2007 Koifman et al. ............. 348/301
2009/0146070 A1* 6/2009 Vieira Da Rocha .. G01T 1/2018
250/370.09
2012/0006973 A1 1/2012 Storm et al.
2013/0070134 A1* 3/2013 Fowler et al. ................ 348/300
2013/0082936 A1* 4/2013 Islamkulov et al. ......... 345/173
2013/0207960 A1* 8/2013 Arques et al. ................ 345/212

FOREIGN PATENT DOCUMENTS

EP          1456860 B1       1/2011
JP       2008-527345 A       7/2008

OTHER PUBLICATIONS

Y. Huang, "Current-Mode CMOS Image Sensor," 2002, A thesis presented to the University of Waterloo for the degree of Master of Applied Science in Electrical Engineering.*
PCT, International Search Report and Written Opinion in PCT/US2014/057107, Dec. 23, 2014, 12 pages.
Karim et al., "Alternate pixel architecture for large area medical imaging," Proceedings of SPIE vol. 4320 (2001), p. 35.

* cited by examiner

*Primary Examiner* — Kiho Kim
(74) *Attorney, Agent, or Firm* — Houst Consulting

(57) ABSTRACT

An imaging apparatus includes a plurality of detector pixels. Each detector pixel comprises a detector element configured to generate a first signal in response to x-ray photons incident thereon, a current mirror configured to generate a second signal representative of the first signal, and a switching transistor configured to allow the second signal and/or the first signal to be transferred out from the detector pixel.

30 Claims, 13 Drawing Sheets

PIXEL ARCHITECTURE FOR IMAGING DEVICES

TECHNICAL FIELD

Embodiments of this disclosure relate to imaging devices and methods. In particular, various embodiments of pixel architectures for imaging devices are described.

BACKGROUND

In conventional pixel architectures of digital imagers shown in FIGS. 1 and 2, a photodiode 12 produces a photo-current proportional to light generated from x-ray exposure. The current is integrated on a parasitic capacitor 14. The accumulated charge is passed to a charge amplifier 16 via a switching transistor 18 through a data line 20. The amplifier 16 converts the charge to a corresponding voltage with a conversion coefficient depending on the capacitance of capacitor 22. Many rows of photodiodes can be read by the same set of amplifiers by consecutive selection of switching transistors. However, using a common data line for multiple pixels increases the parasitic capacitance at the input of the charge amplifier and gains inherent amplifier noise. The resulting deterioration of signal-to-noise ratio (SNR) limits the usability of the imager for low signal levels detected by the photodiodes.

To improve SNR at low signal levels, it will be desirable to have a signal gain in every one of the pixels without substantially affecting the amplifier noise. The commonly used pixel architectures shown in FIGS. 1 and 2 do not have pixel gain. FIG. 3 shows a pixel architecture of a prior art active pixel sensor with signal gain in the pixel. In this configuration, the transconductance of transistor 32 is used to gain the signal integrated on the capacitor 34. Reading out the pixel signal through transistor 36 does not recover the bias voltage across the photodiode 38 needed for normal operation. Therefore, a separate reset operation is needed to restore that voltage. It is done by enabling transistor 40 so the voltage across the photodiode 40 is defined by the difference between $V_{REF1}$ and $V_{REF2}$. A separate reset of the photodiode voltage adds time to the imaging cycle and complexity to the imager. Furthermore, the signal transfer function shown in FIG. 3 is non-linear due to the non-linearity of the voltage-to-current dependency of transistor 32 and 36. Variations in the parameters of the transistors because of temperature or technology fluctuations also greatly affect the signal transfer function of the pixel and lead to image artifacts.

In conventional pixel architectures shown in FIGS. 1-3, the voltage across the photodiode changes during signal integration. Allowing the voltage across the photodiode to change during signal integration causes sensitivity modulation and non-linear behavior. When the signal in some parts of the imager is too strong, it leads to saturation of the photodiode and collapsing of the voltage across it. This effect complicates the use of continuous photodiodes, which are being increasingly employed in imaging devices.

SUMMARY

Embodiments of pixel architectures for imaging devices provide signal gain in every one of the pixels to improve signal-to-noise ratio at low signal levels. The pixel architectures of this disclosure provide improved linearity and do not require a separate reset cycle. The pixel architectures can be used for real-time monitoring of the signal intensity for the whole imager or for selected parts of it.

Other embodiments are described further herein.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION

Figure 1:
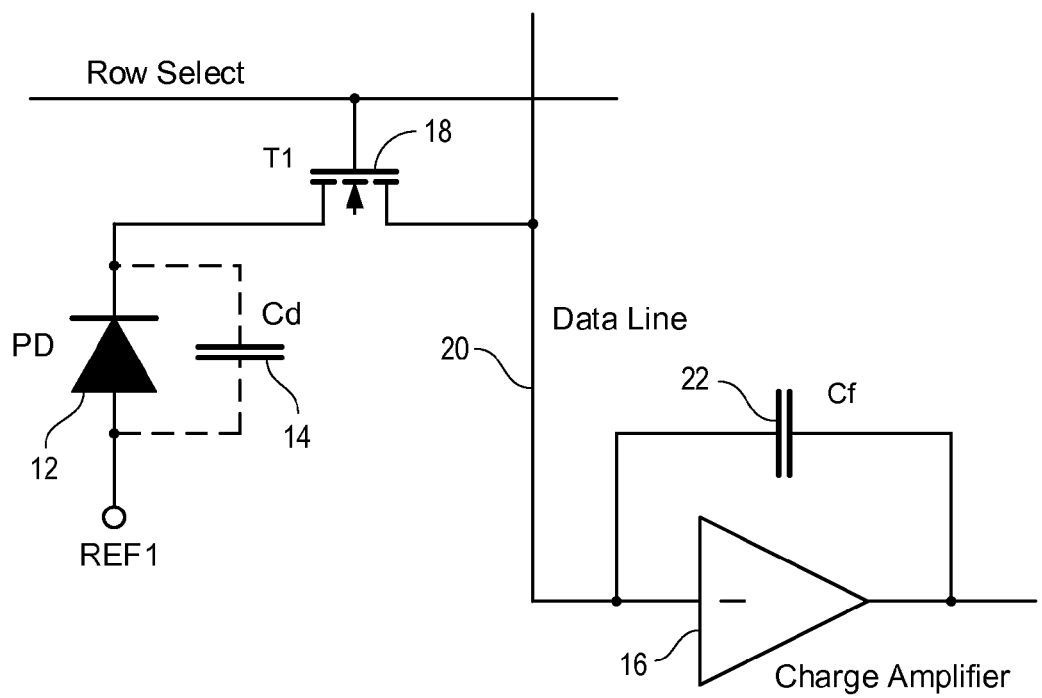
FIG. 1 illustrates a pixel architecture of a prior art digital imaging device.
Figure 2:
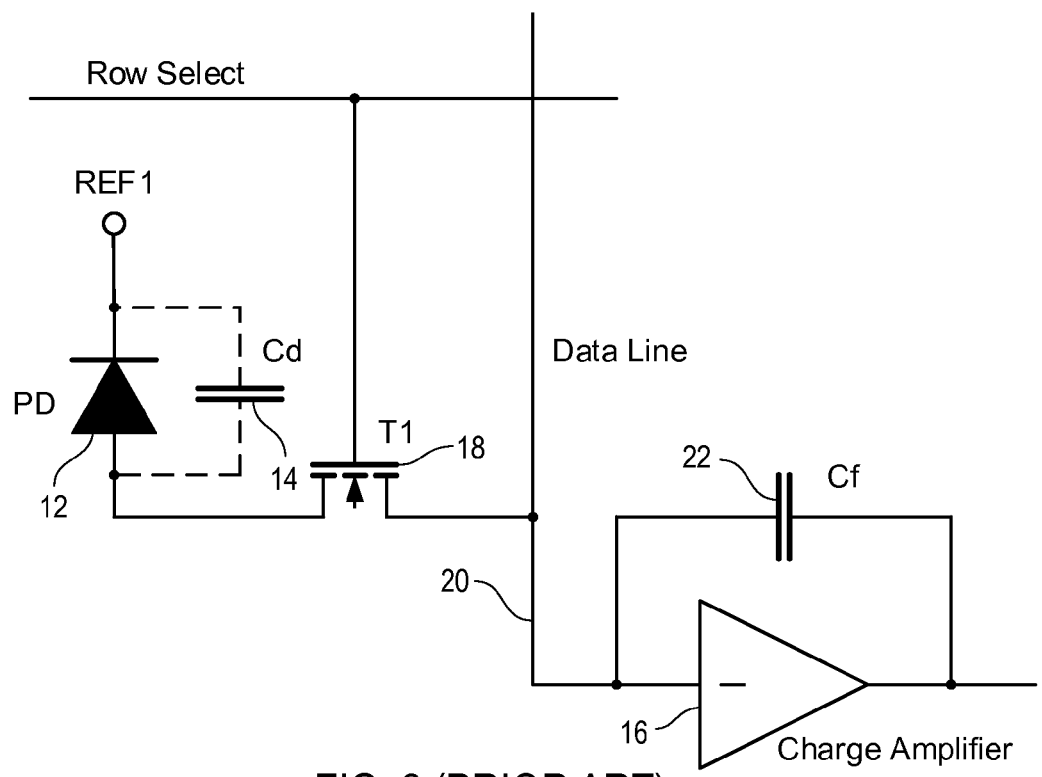
FIG. 2 illustrates a pixel architecture of a prior art digital imaging device.
Figure 3:
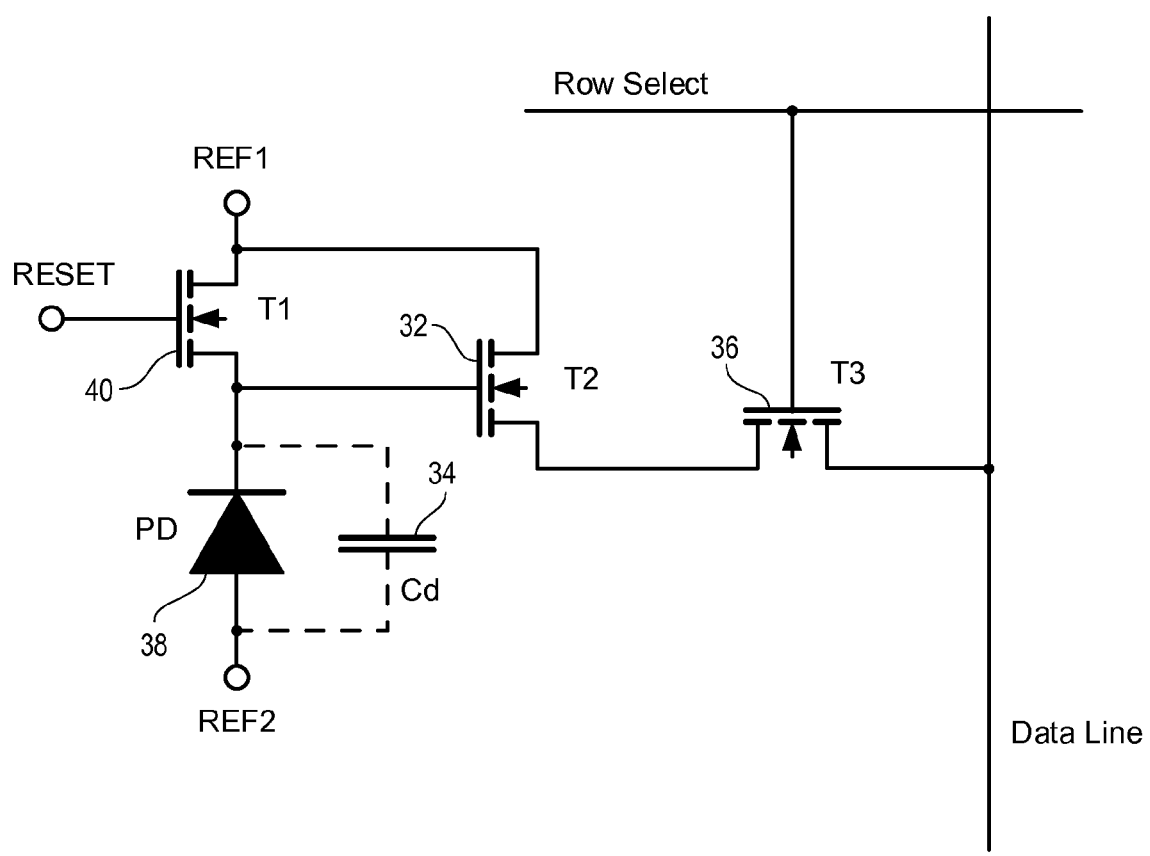
FIG. 3 illustrates a pixel architecture of a prior art digital imaging device.

Various embodiments of pixel architectures for imaging devices and methods are described. It is to be understood that the disclosure is not limited to the particular embodiments described as such may, of course, vary. An aspect described in conjunction with a particular embodiment is not necessarily limited to that embodiment and can be practiced in any other embodiments. Various embodiments are presented using NMOS transistors in the circuits. It will be appreciated that the circuits can be fully functional with PMOS transistors with appropriate change of the polarity of reference voltages. Further, it will be appreciated that the pixel architectures described in this disclosure can be implemented in both scintillator-based and photoconductor-based X-ray imaging devices and light imaging devices. The pixel architectures can be implemented in both TFT flat panel imagers and CMOS imagers.

All technical and scientific terms used herein have the meaning as commonly understood by one of ordinary skill in the art unless specifically defined otherwise. As used in the description and appended claims, the singular forms of "a," "an," and "the" may include plural references unless the context clearly dictates otherwise. The term "or" refers to a nonexclusive "or" unless the context clearly dictates otherwise. In the following description, well known components or steps may not be described in detail in order to avoid unnecessarily obscuring the embodiments of the disclosure.

As used herein, the term "detector element" refers to an element in a detector pixel that converts x-ray photons to electrical charges. A detector element may comprise a photoconductor material which can convert x-ray photons directly to electrical charges (electron-hole pairs) in a direct detection scheme. Suitable photoconductor material include and are not limited to mercuric iodide ($HgI_2$), lead iodide ($PbI_2$), bismuth iodide ($BiI_3$), cadmium zinc telluride (CdZnTe), amorphous selenium (a-Se), etc. In some embodiments, a detector element may comprise a scintillator material which converts x-ray photons to light and a photosensitive element coupled to the scintillator material to convert the light to electrical charges (indirect detection scheme). Suitable scintillator materials include and are not limited to gadolinium oxisulfide ($Gd_2O_2S$:Tb), cadmium tungstate ($CdWO_4$), bismuth germanate ($Bi_4Ge_3O_{12}$, or BGO), cesium iodide (CsI), cesium iodide thallium (CsI:Tl), or any combination thereof. Suitable photosensitive element may include a photodiode, a photogate, or phototransistors etc. As used herein, the term "continuous photodiodes" refers to the use of a continuous semiconductor layer covering a large number of pixels. One side of the semiconductor or photoconductor layer may have a common conductive electrode and the other side will have separate electrodes for every pixel of the imager.

As used herein, the term "TFT imager" or "TFT detector" refers to a detector that includes a plurality of detector pixels each comprising a thin-film transistor. A TFT detector may be formed on a substrate over which thin films of semiconductors, dielectrics and metallic contacts are deposited to form TFTs and other pixel elements. The TFTs may be amorphous silicon (a-Si) TFTs or crystalline or polycrystalline or oxide TFTs. Fabrication of TFT imagers is well known in the art and thus its detailed description is omitted here in order to avoid obscuring description of the embodiments of the disclosure.

As used herein, the term "CMOS detector" or "CMOS sensor" refers to a detector that includes a plurality of detection pixels each comprising a complementary metal-oxide-semiconductor circuit or polycrystalline silicon-oxide-semiconductor circuit. A CMOS sensor may be formed on a wafer or substrate which functions as an active semiconductor of CMOS circuits. Fabrication of CMOS detector is well known in the art and thus its detailed description is omitted here in order to avoid obscuring description of the embodiments of the disclosure.

As used herein, the term "current mirror" refers to an electrical circuit that reads a current entering in a read-node and mirrors this current with a suitable gain factor to an output node or nodes.

An imaging apparatus comprising a plurality of imaging pixels is provided. Each imaging pixel of the imaging apparatus may comprise one or more current mirrors configured to amplify a signal produced by a photosensitive element. In some embodiments, an imaging apparatus comprising a plurality of detector pixels is provided. Each detector pixel comprises a detector element configured to generate a first signal in response to x-ray photons incident thereon, a current mirror configured to generate a second signal representative of the first signal, and a switching transistor configured to allow the second signal and/or the first signal to be transferred out from the detector pixel. The detector element may comprise a photoconductor material configured to convert x-ray photons directly to electron-hole charges. Alternatively, the detector element may comprise a scintillator material configured to convert x-ray photons to light and a photosensitive element configured to convert light to electrical charges. The switching transistor may be a thin film transistor or a CMOS transistor.

In some embodiments, each detector pixel may further comprise a switch controllable by a global select signal and connected to the current mirror such that when the switch is turned on, the combined second and first signals are transferred out from the detector pixel, and when the switch is turned off the first signal is transferred out from the detector pixel.

An imaging apparatus comprising a plurality of detector pixels is provided. Each detector pixel comprises a detector element configured to generate a first signal in response to x-ray photons incident thereon, a first current mirror configured to generate a second signal representative of the first signal, a first capacitor configured to store the second signal, and a first switching transistor configured to allow the second signal to be transferred out from the detector pixel.

In some embodiments, each detector pixel may further comprise a second current mirror connected to the first current mirror via a switch controllable by a global select signal such that when the switch is turned on, the first and second current mirror collectively generate the second signal, and when the switch in turned off the first current mirror generates the second signal.

In some embodiments, each detector pixel may further comprise a second current mirror configured to generate a third signal representative of the first signal, a second capacitor configured to store the third signal, and a second switching transistor configured to allow the third signal to be transferred out from the detector pixel. The first and the second switching transistors may be respectively coupled to different charge amplifiers external to the detector pixel via different data lines. Alternatively, the first and the second switching transistors may be coupled to a same external charge amplifier via a same data line with their gates connected to different row select lines.

Exemplary embodiments will now be described with reference to the figures. It should be noted that some figures are not necessarily drawn to scale. The figures are only intended to facilitate the description of specific embodiments, and are not intended as an exhaustive description or as a limitation on the scope of the disclosure.

Figure 4:
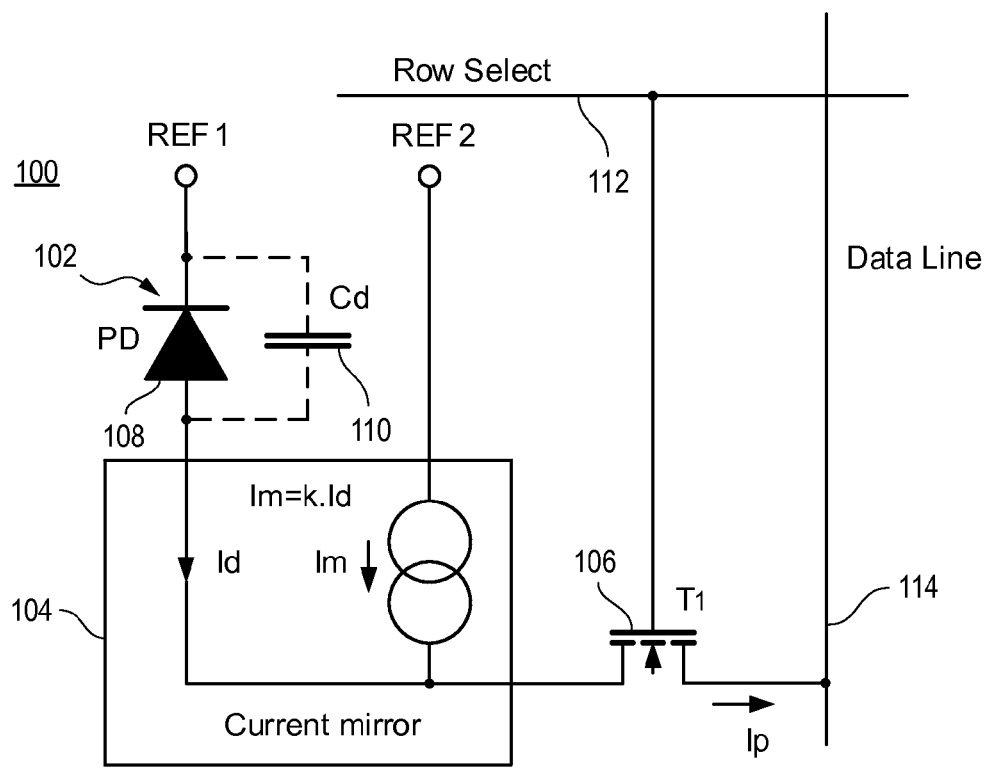
FIG. 4 illustrates a pixel architecture including a current mirror circuit according to some embodiments of this disclosure.

Referring to FIG. 4, an electrical circuit of a detector pixel 100 according to some embodiments of this disclosure will now be described. As shown in FIG. 4, the detector pixel 100 includes a detector element 102, a current mirror 104, and a switching transistor 106.

The detector element 102 may include a scintillator material (not shown) and a photosensitive element such as a photodiode 108. The scintillator material may be configured to convert x-ray photons to light. The photodiode 108 may be configured to convert the light to electrical charges. The electrical charges generated by the detector element 102 may be proportional to the amount of x-rays incident thereon. The electrical charges may be collected by or integrated on a capacitor 110. The capacitor 110 may be a parasitic or junction capacitor of the photodiode 108 or a separately manufactured capacitor coupled to the photodiode 108.

In some embodiment, the detector element 102 may include a photoconductor material configured to convert x-ray photons directly to electron-hole charges. As such, a capacitor may be separately manufactured to integrate the charges generated by the photoconductor material.

The current mirror 104, which will be described in greater detail below, may be coupled to the detector element 102 configured to amplify the charges integrated on the capacitor 110 as they are read out through the switching transistor 106. The current mirror 104 may be configured to have a suitable gain factor k such that an input current $I_d$, from the detector element 102 may be amplified to provide an amplified current $I_m$, where $I_m = k \cdot I_d$.

Figure 13:
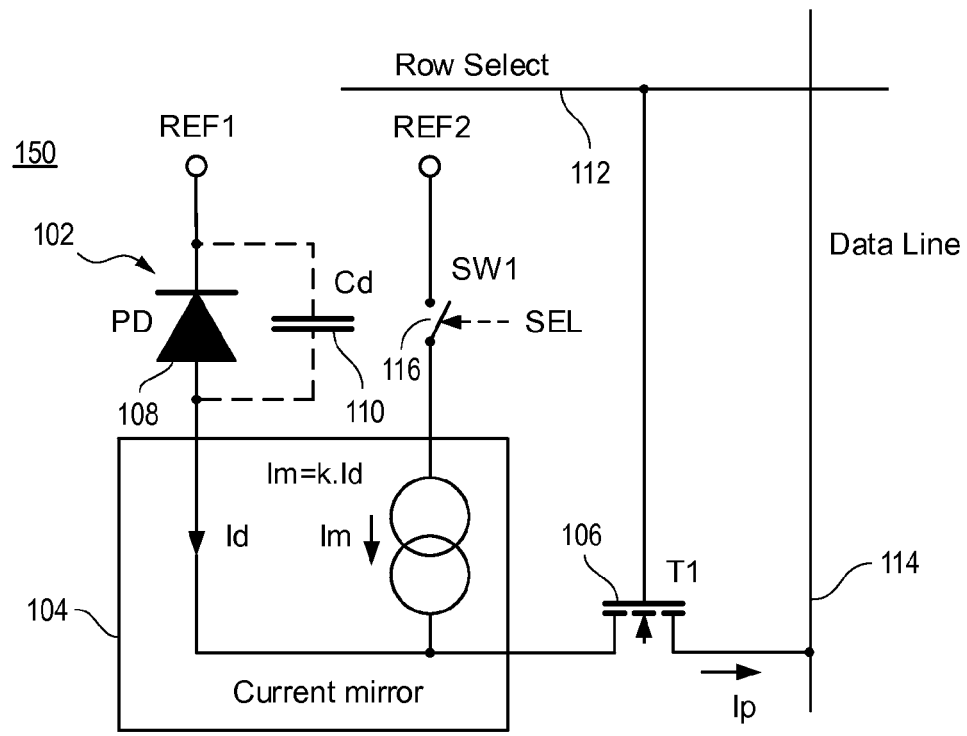
FIG. 13 illustrates a variation of the pixel architecture shown in FIG. 4 including a switch controllable by a global select signal according to some embodiments of this disclosure.

The switching transistor 106 allows transfer of the combined input signal $I_d$, and amplified signal $I_m$, to an external charge amplifier (not shown) via a data line 114. In embodiments where a current mirror is connected to a switch controllable by a global select signal, as shown in FIG. 13 and described below, the switching transistor 106 allows transfer of the original signal current $I_d$, without gain, to an external charge amplifier. The switching transistor 106 may be a TFT transistor or a CMOS transistor.

Still referring to FIG. 4, during charge integration in operation, the transistor 106 is turned OFF. The electric charge generated in the detector element 102 as a result of incident radiation is integrated on the capacitor 110. During readout, the transistor 106 is turned ON via a row select line 112 and the charge integrated on the capacitor 110 flows into the current mirror 104 as an input current $I_d$. The current mirror 104 amplifies the input current $I_d$, with a gain fact k, providing an amplified current $I_m = k \cdot I_d$. The combined input current $I_d$, and amplified current $I_m$, are then passed through the transistor 106 to an external charge amplifier via a data line 114. Therefore, the resulting current $I_p$, integrated on the external charge amplifier is (k+1) times of the current $I_d$, that would be passed through the transistor 106 without gain by a current mirror. At the end of the readout, the capacitor 110 may be reset or recharged and the pixel 100 is ready for the next Integration.

Figure 5:
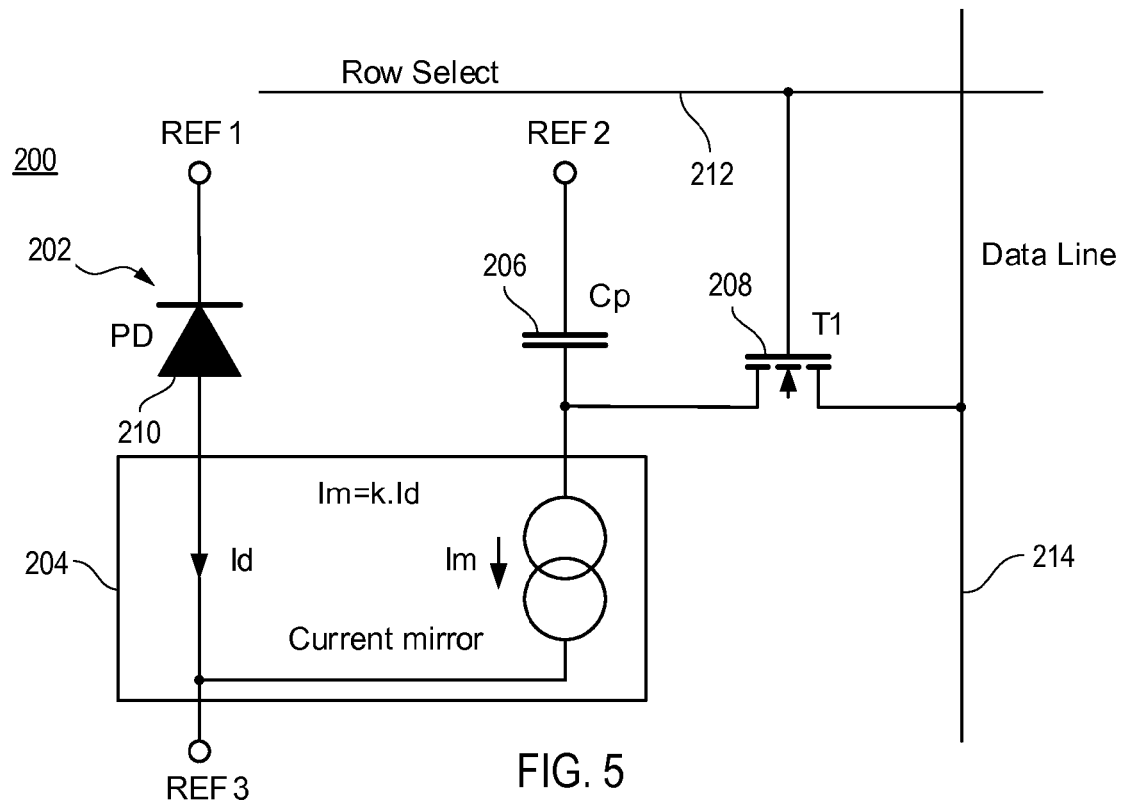
FIG. 5 illustrates a pixel architecture including a current mirror circuit and a storage capacitor according to some embodiments of this disclosure.

FIG. 5 illustrates an electrical circuit of a detector pixel 200 according to some alternative embodiments of this disclosure. As shown, the detector pixel 200 includes a detector element 202, a current mirror 204, a storage capacitor 206, and a switching transistor 208.

The detector element 202 may include a scintillator material (not shown) and a photosensitive element such as a photodiode 210. The scintillator material may be configured to convert x-ray photons to light. The photodiode 210 may be configured to convert the light to electrical charges. The electrical charges generated by the detector element 202 may be proportional to the amount of x-rays incident thereon. Alternatively, the detector element 202 may include a photoconductor material configured to convert x-ray photons directly to electron-hole charges.

The current mirror 204, which will be described in greater detail below, may be coupled to the detector element 202 configured to amplify the charges generated by the detector element 202. The current mirror 204 may be configured to have a suitable gain factor k such that an input current $I_d$, from the detector element 202 may be amplified to provide an amplified current $I_m$, where $I_m = k \cdot I_d$.

The capacitor 206 may be coupled to the output node of the current mirror 204 and configured to integrate the amplified current $I_m$. The capacitor 206 may be further coupled to the switching transistor 208 such that the amplified current integrated in the capacitor 206 may be read out through the switching transistor 208.

The switching transistor 208 allows transfer of the amplified signal from the stored capacitor 206 to an external charge amplifier (not shown) via a data line 214. The switching transistor 208 may be a TFT transistor or a CMOS transistor.

In operation, during charge integration the transistor 208 is turned OFF. The electric charge generated in the detector element 202 as a result of incident radiation is passed into the current mirror 204 and amplified by a suitable gain factor. The amplified current $I_m$, is integrated on the capacitor 206. The signal amplification and integration is continuous, including during the x-ray exposure. During readout, the transistor 208 is turned ON via a row select line 212 and the charge integrated on the storage capacitor 206 is passed through the transistor 208 to an external charge amplifier via a data line 214. The gained signal can be read-out from the storage capacitor 206 independent from the integration. The current integrated on the external charge amplifier is $I_m$, which is k times of the current $I_d$, generated by the detector element 202. Reading out the charge resets the capacitor 206 and the pixel 200 is ready for the next Integration.

The detector pixel 200 shown in FIG. 5 allows for continuous signal amplification and integration including during the x-ray exposure. The gained signal can be read-out independent from the integration. Furthermore, the circuit shown in FIG. 5 allows for real time monitoring of the exposure of the whole imager or parts of it by monitoring the current in one, two or all of references REF1, REF2, and REF3. I Because the charge generated by the photodiode is constantly drained through the current mirror, it does not accumulate on the parasitic capacitance of the photodiode. This makes the voltage across the photodiode 210 not dependent on the signal, which helps reduce modulation of sensitivity of the photodiode 210 which would otherwise lead to non-linear behavior. Further, because the voltage of the photodiode 210 is not dependent on the signal, the photodiode 210 would not saturate into forward bias with large signal levels. This allows for the use of continuous photodiodes across the imaging area without image artifacts caused by diode saturation.

Figure 6:
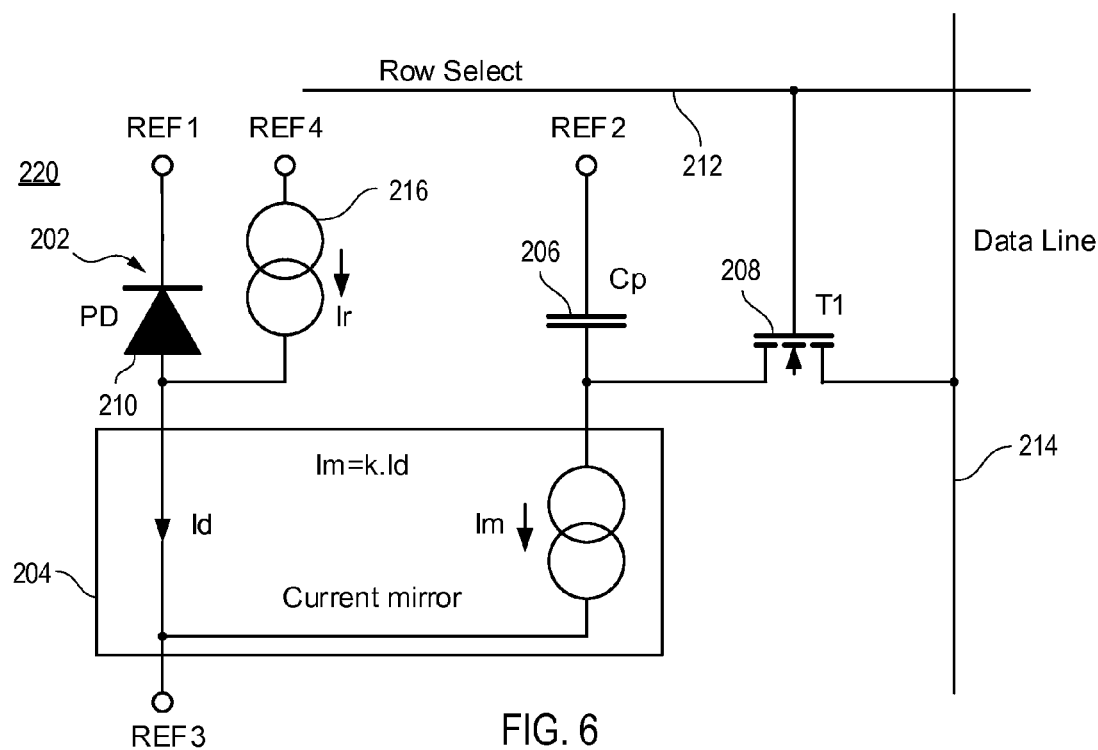
FIG. 6 illustrates a variation of the pixel architecture shown in FIG. 5 according to some embodiments of this disclosure.

FIG. 6 illustrates an electrical circuit of a detector pixel 220 according to some alternative embodiments of this disclosure. The detector pixel 220 shown in FIG. 6 is similar to the detector pixel 200 shown in FIG. 5 is many aspects. For example, the detector pixel 220 includes a detector element 202, a current mirror 204, a storage capacitor 206, and a switching transistor 208. In addition, the detector pixel 220 further includes a current source 216 ($I_r$) coupled to the photodiode 210 and the current mirror 204. The current source 216 may provide a constant offset current to the input of the current mirror 204 to improve its performance. For example, there may be a response time for the MOS transistor in the current mirror to change from cutoff mode to saturation mode when $I_d$, is small. The current source 216 may speed up the response time as the MOS transistor coupled to the current source 216 is kept in saturation mode due to the constant current $I_r$.

Figure 7:
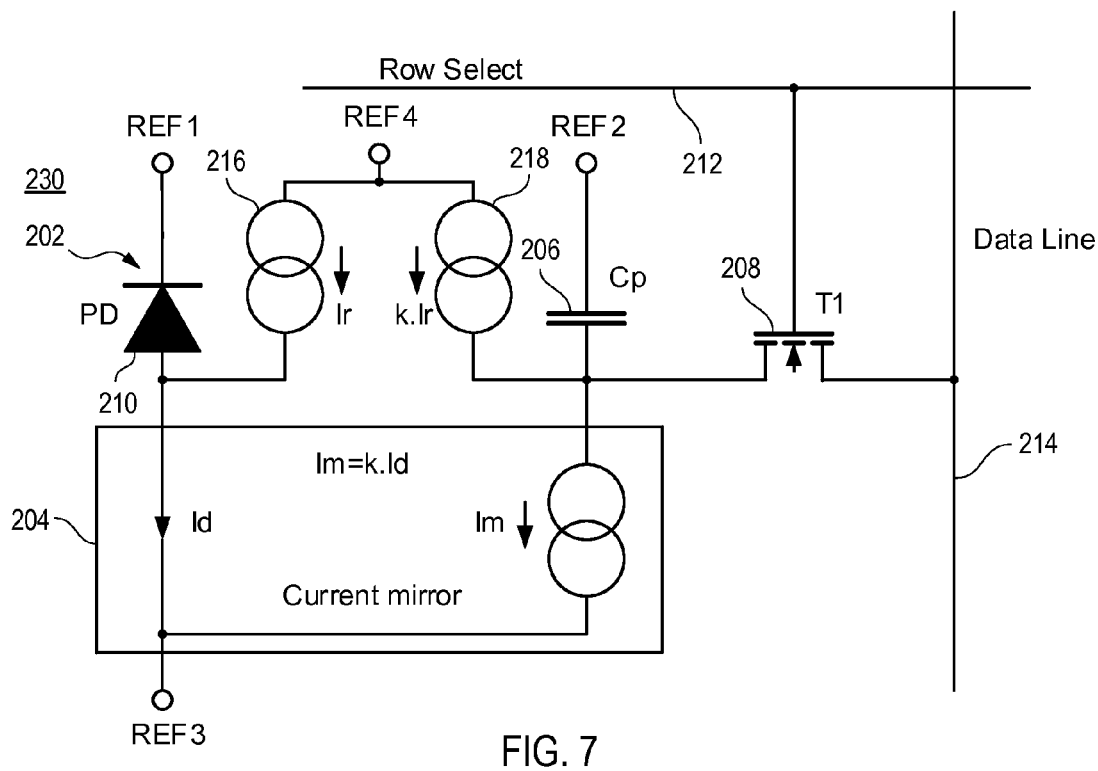
FIG. 7 illustrates a further variation of the pixel architecture shown in FIG. 5 according to some embodiments of this disclosure.

FIG. 7 illustrates an electrical circuit of a detector pixel 230 according to further alternative embodiments of this disclosure. The detector pixel 230 shown in FIG. 7 is a variation of the detector pixel 220 shown in FIG. 6. An additional current source 218 (k·I_r) is coupled to the output of the current mirror 204 to cancel the output current produced by the current mirror 204 resulting from the addition of the offset current source 216. In FIG. 7, the MOS transistors in the current mirror 204 may be kept in saturation mode due to the constant current I_r, and k·I_r, from the current sources 216 and 218, which may improve their performance and reduce the offset signal on the integration capacitor Cp.

FIGS. 8-12 illustrate some exemplary current mirror circuits that can be implemented in the detector pixels according to embodiments of this disclosure. It should be noted that other current mirror circuits known in the art can be used. This disclosure is not limited to the particular current mirror circuits described herein.

Figure 8:
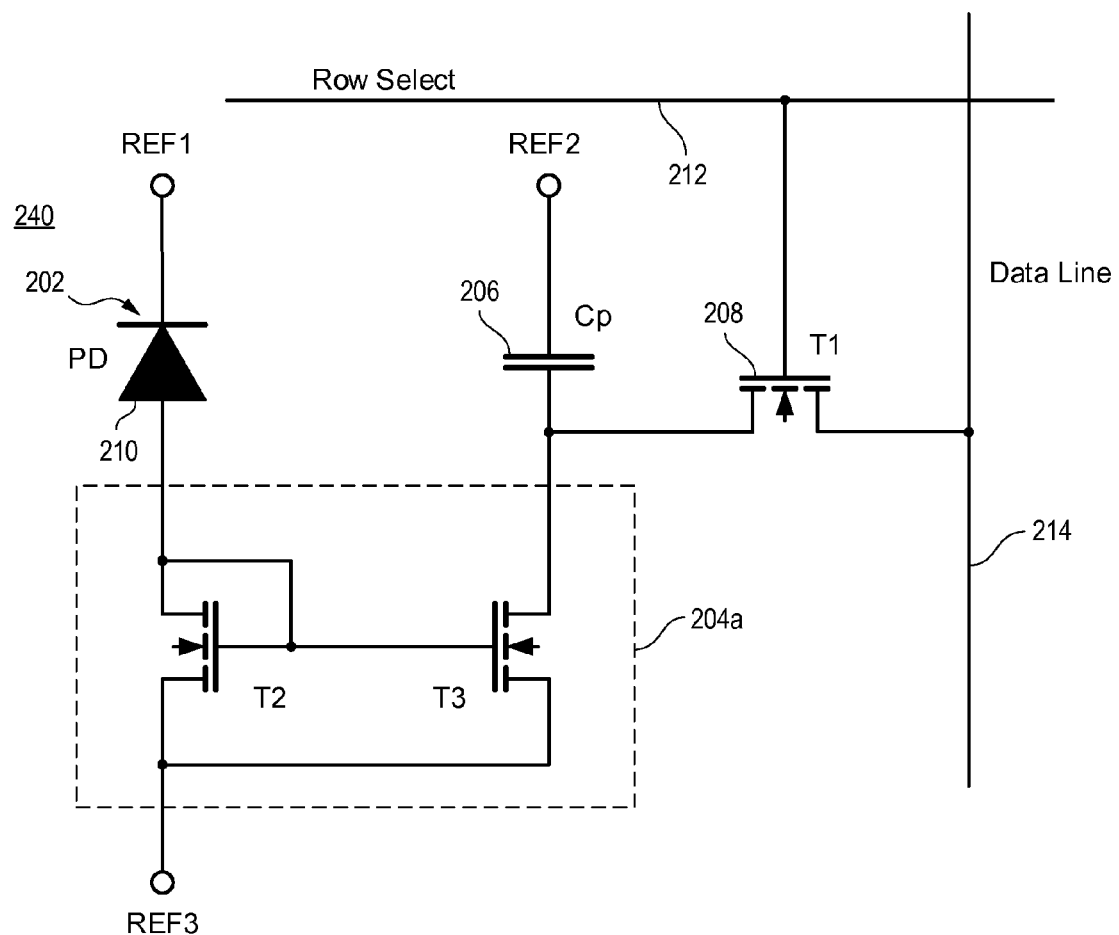
FIGS. 8-12 illustrate various embodiments of current mirror circuits which can be implemented in the pixel architectures according to embodiments of this disclosure.

FIG. 8 illustrates a basic current mirror circuit 204a, which can be implemented in a detector pixel 240 according some embodiments of this disclosure. In the basic configuration, Transistor T2 and T3 have the common source and common gate connection. The drain of transistor T2 is connected to the gate. From the connection of transistors T2 and T3 in FIG. 8, $$V_{DS2}=V_{GS2}=V_{GS3}$$

where D stands for drain, S for source, and G for gate. Transistors T2 and T3 operate in the saturation mode, in which case the drain current $I_D$, can be expressed as:

$$I_D = \frac{K'}{2}\left(\frac{W}{L}\right)(V_{GS} - V_{th})^2(1 + \lambda V_{DS})$$

where K' is a technology dependent constant for the transistor, W/L is the transistor width to length ratio, $V_{GS}$, is the gate-source voltage, $V_{th}$, is the threshold voltage, $\lambda$ is the channel length modulation parameter, and $V_{DS}$, is the drain-source voltage.

The current gain factor k can be expressed as follows:

$$k = \frac{I_m}{I_d} = \frac{I_{T3}}{I_{T2}} = \frac{\left(\frac{W}{L}\right)_3}{\left(\frac{W}{L}\right)_2}\frac{1+\lambda V_{DS3}}{1+\lambda V_{DS2}}$$

Figure 9:
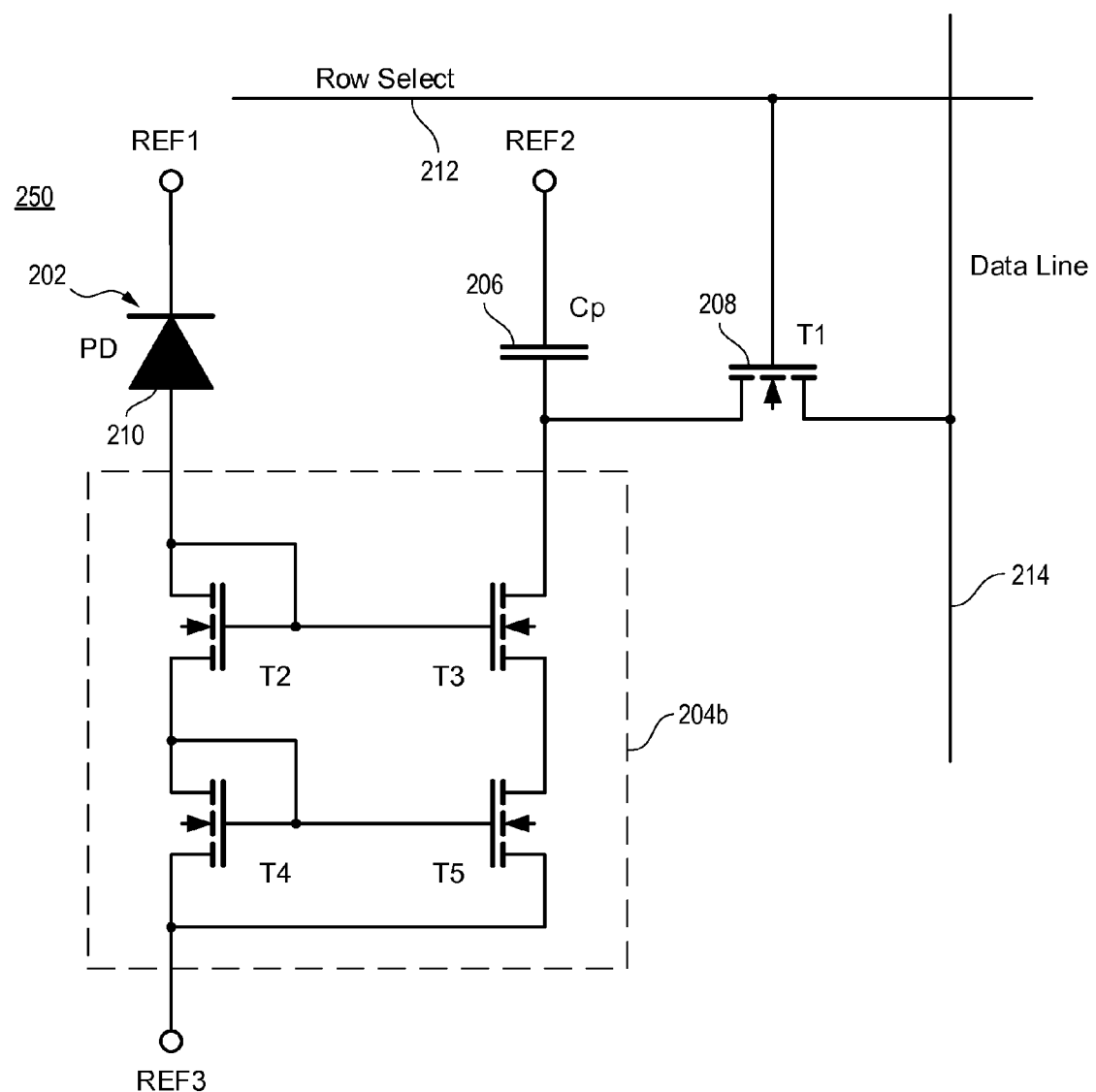

FIG. 9 illustrates a "Cascode" current mirror circuit 204b, which includes four transistors T2-T5 with 2, cascode stages. From the connection of the transistors T2-T5 in FIG. 9, $$V_{DS5}=V_{DS4}+V_{GS2}-V_{GS3}$$

$$V_{DS5}=V_{DS4}, \text{ if } V_{GS2}=V_{GS3}$$

The current gain factor k can be expressed as:

$$k = \frac{I_m}{I_d} = \frac{I_{T3}}{I_{T2}} = \frac{I_{T5}}{I_{T4}} = \frac{\left(\frac{W}{L}\right)_5}{\left(\frac{W}{L}\right)_4}\frac{1+\lambda V_{DS5}}{1+\lambda V_{DS4}} = \frac{\left(\frac{W}{L}\right)_5}{\left(\frac{W}{L}\right)_4}$$

Figure 10:
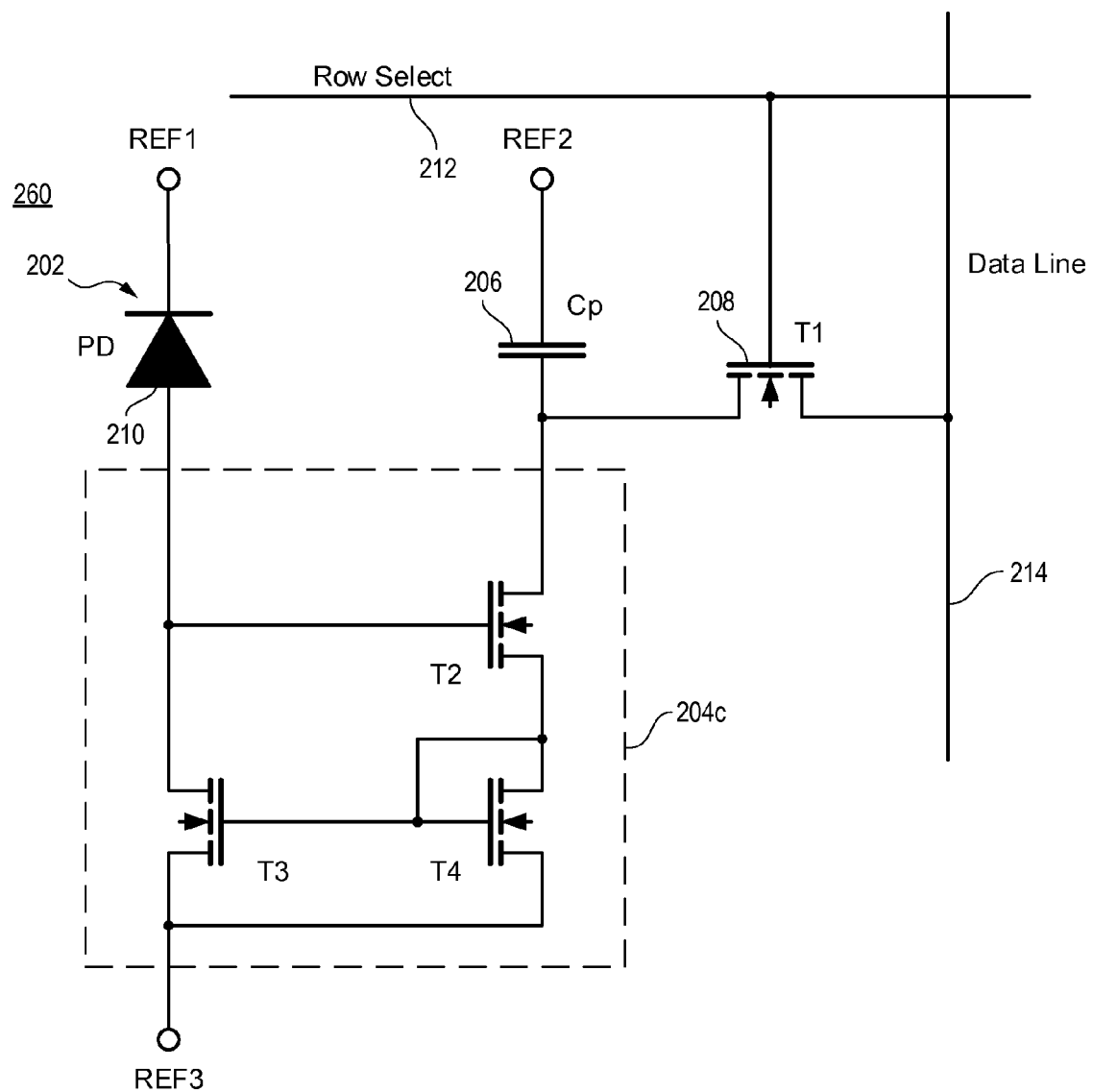

FIG. 10 illustrates a "Wilson" current mirror circuit 204c, which includes three transistors T2-T4. From the connection of the transistors T2-T4 in FIG. 10, $$V_{DS3}=V_{GS2}+V_{GS4}$$

$$V_{DS4}=V_{GS4}$$

The current gain k can be expressed as:

$$k = \frac{I_m}{I_d} = \frac{I_{T2}}{I_{T3}} = \frac{I_{T4}}{I_{T3}} = \frac{\left(\frac{W}{L}\right)_4}{\left(\frac{W}{L}\right)_3}\frac{1+\lambda V_{DS4}}{1+\lambda V_{DS3}} = \frac{\left(\frac{W}{L}\right)_4}{\left(\frac{W}{L}\right)_3}\frac{1+\lambda V_{GS4}}{1+\lambda (V_{GS2}+V_{GS4})}$$

Figure 11:
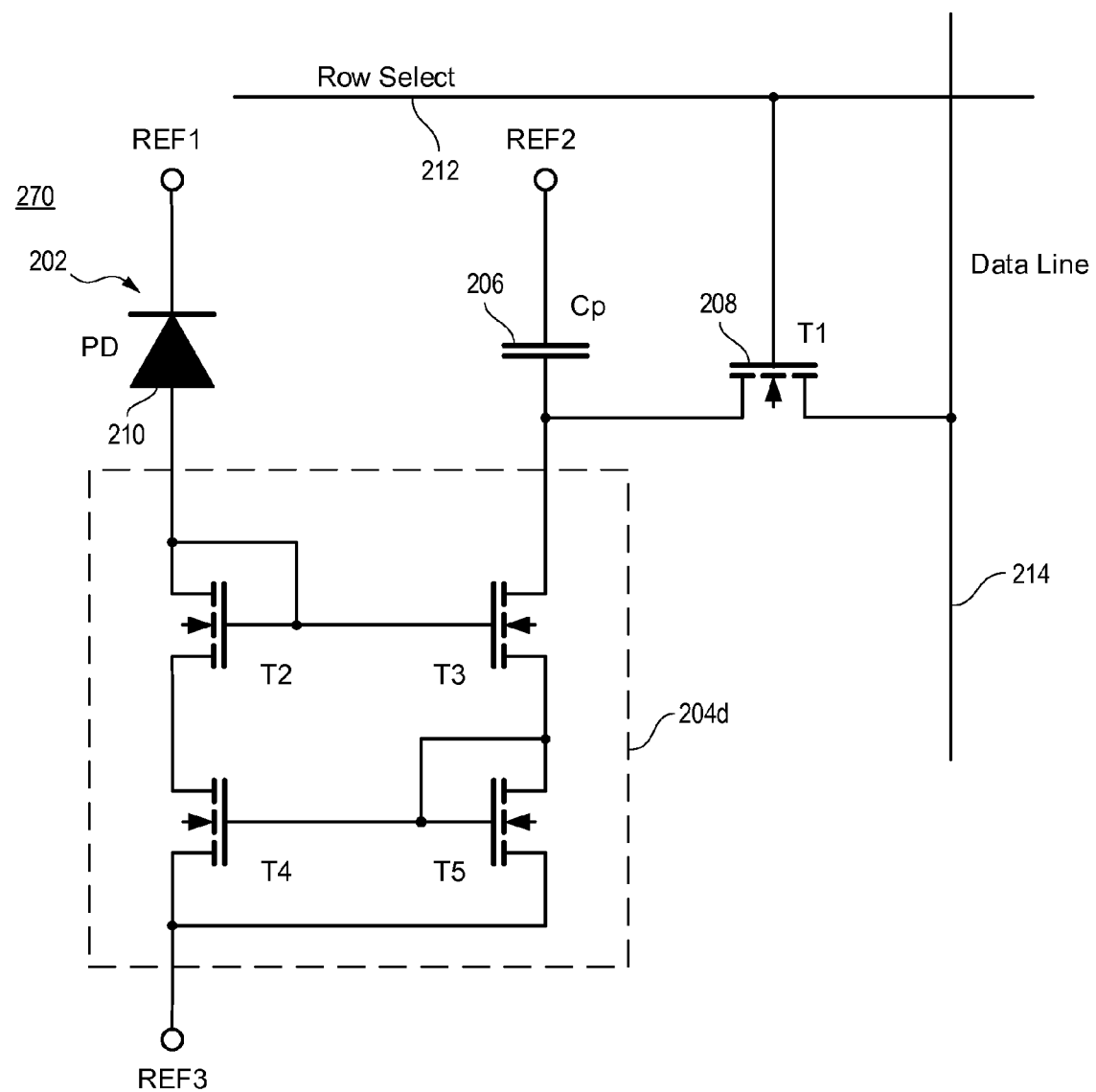

FIG. 11 illustrates a modified Wilson current mirror 204d, including four transistors T2-T5, adding another transistor on top of the Wilson current mirror 204c, shown in FIG. 10. From the connection of FIG. 11, $$V_{DS5}=V_{DS4}+V_{GS2}-V_{GS3}$$

$$V_{DS5}=V_{DS4}, \text{ if } V_{GS2}=V_{GS3}$$

The current gain k can be expressed as:

$$k = \frac{I_m}{I_d} = \frac{I_{T3}}{I_{T2}} = \frac{I_{T5}}{I_{T4}} = \frac{\left(\frac{W}{L}\right)_5}{\left(\frac{W}{L}\right)_4}\frac{1+\lambda V_{DS5}}{1+\lambda V_{DS4}} = \frac{\left(\frac{W}{L}\right)_5}{\left(\frac{W}{L}\right)_4}$$

Figure 12:
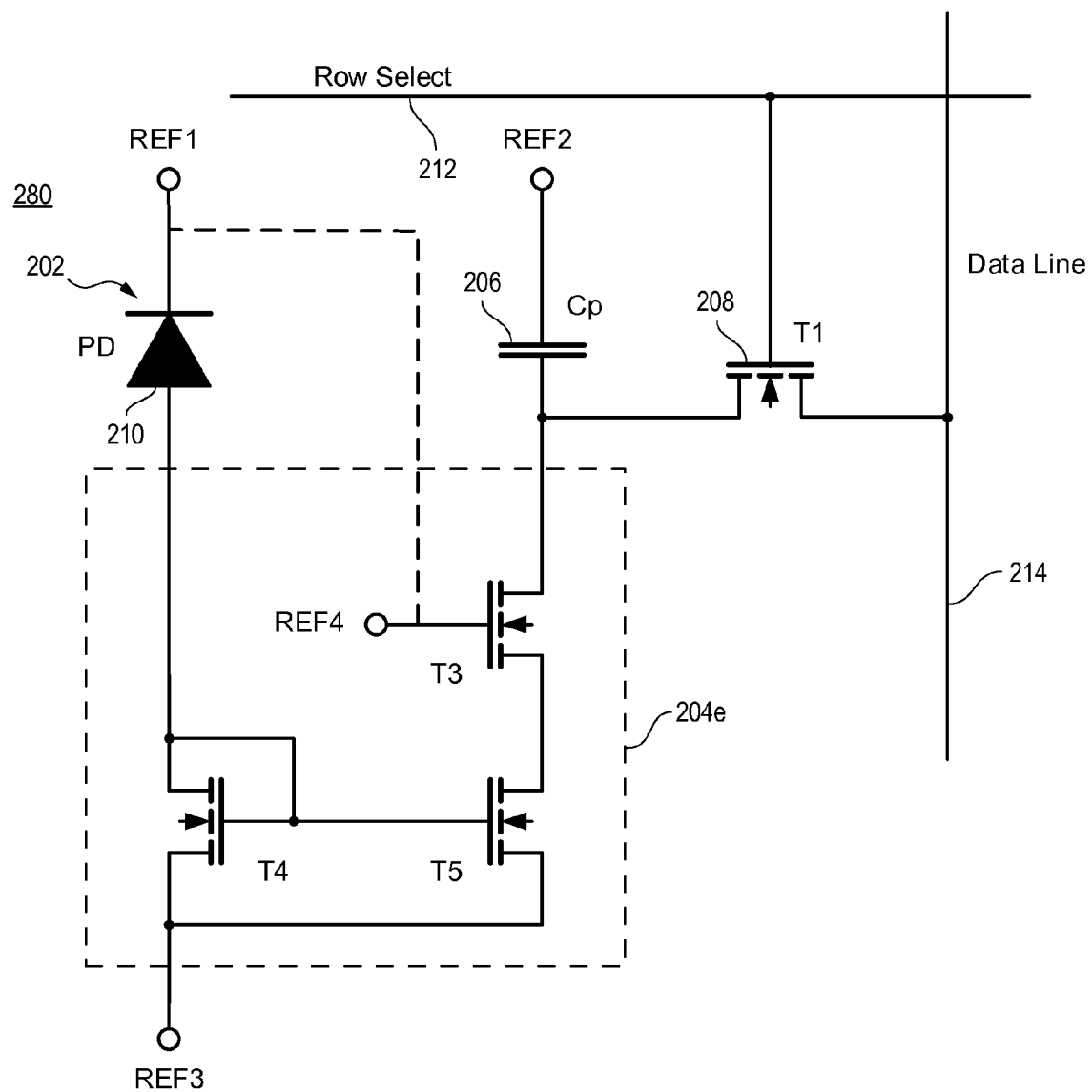

In FIG. 12, another transistor T3 is added on top of a basic current mirror formed by transistors T4 and T5, with the gate transistor T3 connected to REF4, which can be aligned with REF1. From the connection, $$V_{DS4}=V_{GS4}=V_{GS5}$$

The current gain k equals:

$$k = \frac{I_m}{I_d} = \frac{I_{T3}}{I_{T4}} = \frac{I_{T5}}{I_{T4}} = \frac{\left(\frac{W}{L}\right)_5}{\left(\frac{W}{L}\right)_4}\frac{1+\lambda V_{DS5}}{1+\lambda V_{DS4}} = \frac{\left(\frac{W}{L}\right)_5}{\left(\frac{W}{L}\right)_4}\frac{1+\lambda V_{DS5}}{1+\lambda V_{GS5}}$$

It should be noted that the current mirrors shown in FIGS. 8-12 are provided for illustration purpose. Other variations of current mirrors can be implemented in the detector pixels according to embodiments of this disclosure.

FIG. 13 illustrates an electrical circuit of a detector pixel 150 according to some alternative embodiments of this disclosure. The detector pixel 150 shown in FIG. 13 is similar to the detector pixel 100 shown in FIG. 4 in many aspects. For example, the detector pixel 150 includes a detector element 102, a current mirror 104, and a switching transistor 106. In comparison, the detector pixel 150 shown in FIG. 13 further includes a switch 116 connected to the current mirror 104. The switch 116 may be a transistor switch controlled by a global select signal (SEL). The switch 116 may turn on or turn off the current mirror 104 by applying a global select signal (SEL). During read-out in operation, the current mirror 104 may be turned on so that the combined input current $I_d$, and amplified current $I_m$, may be passed through the transistor 106 to an external charge amplifier via a data line 114. The resulting current $I_p$, integrated on the external charge amplifier would be (k+1) times of the current $I_d$, that would be passed through the transistor 106 without amplification by a current mirror. Alternatively, the current mirror 104 may be turned off during read-out so that the original input current $I_d$, without gain, may be passed through the transistor 106 to an external charge amplifier via a data line 114. The resulting current $I_p$, integrated on the external charge amplifier would be the original current $I_d$, generated by the detector element 102. Therefore, the pixel architecture 150 shown in FIG. 13 allows for the use of a switch controllable by a global select signal to determine the signal gain in the pixel.

Figure 14:
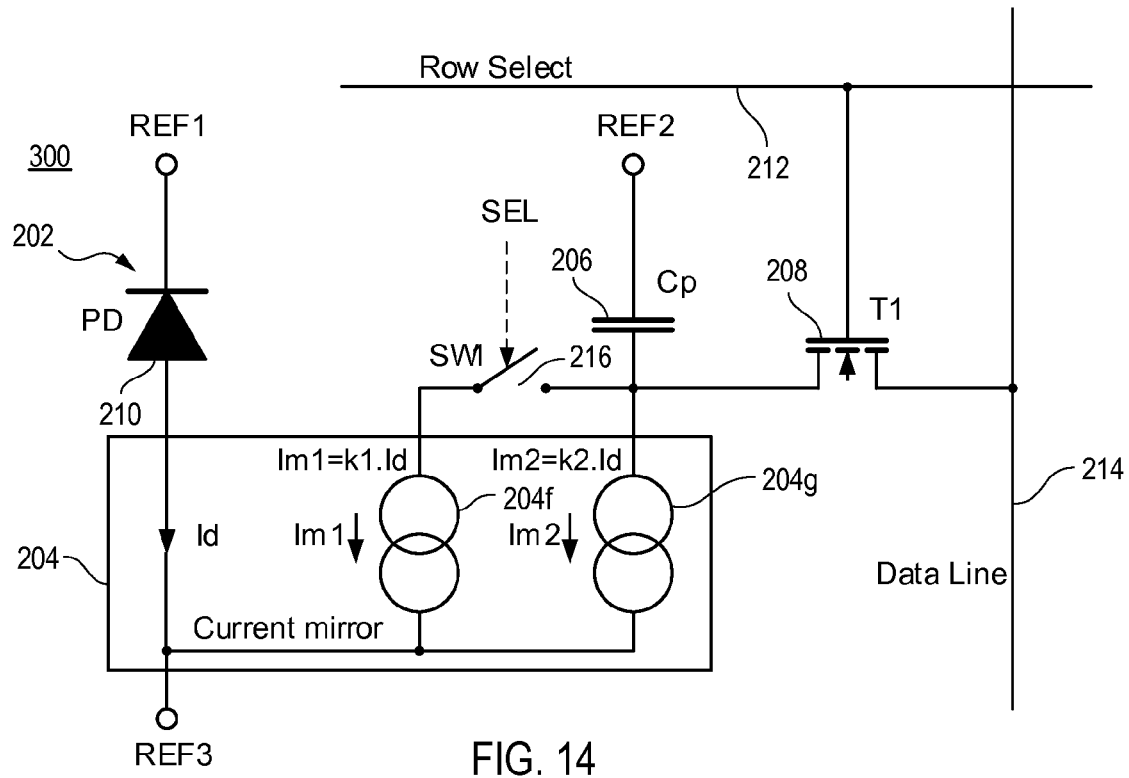
FIG. 14 illustrates a variation of the pixel architecture shown in FIG. 5 including two current mirrors and a switch controllable by a global select signal according to some embodiments of this disclosure.

FIG. 14 illustrates an electrical circuit of a detector pixel 300 according to some alternative embodiments of this disclosure. The detector pixel 300 shown in FIG. 14 is similar to the detector pixel 200 shown in FIG. 5 in many aspects. In comparison, the detector pixel 300 shown in FIG. 14 includes two current mirrors 204f, 204g, and a switch 216 connecting the two current mirrors. It should be noted that more than two current mirrors may be used and the embodiment shown in FIG. 14 is not limited to the number of current mirrors. As shown, the first current mirror 204f, may be configured to have a first gain factor k1 and the second current mirror 204g, may be configured to have a second gain factor k2. The first and second current mirrors 204f, 204g, may be connected by a switch 216 controllable by a global select signal (SEL). When the switch 216 is turned OFF, the input current $I_d$, from the photodiode 210 is gained by k2 time by the second current mirror 204g, and the gained current $I_m2$ is integrated on the storage capacitor 206. When the switch 216 is turned ON, the input current $I_d$, is gained by (k1+k2) times by the two current mirrors 204f, 204g, and the gained current ($I_m1+I_m2$) is integrated on the storage capacitor 206.

Figure 15:
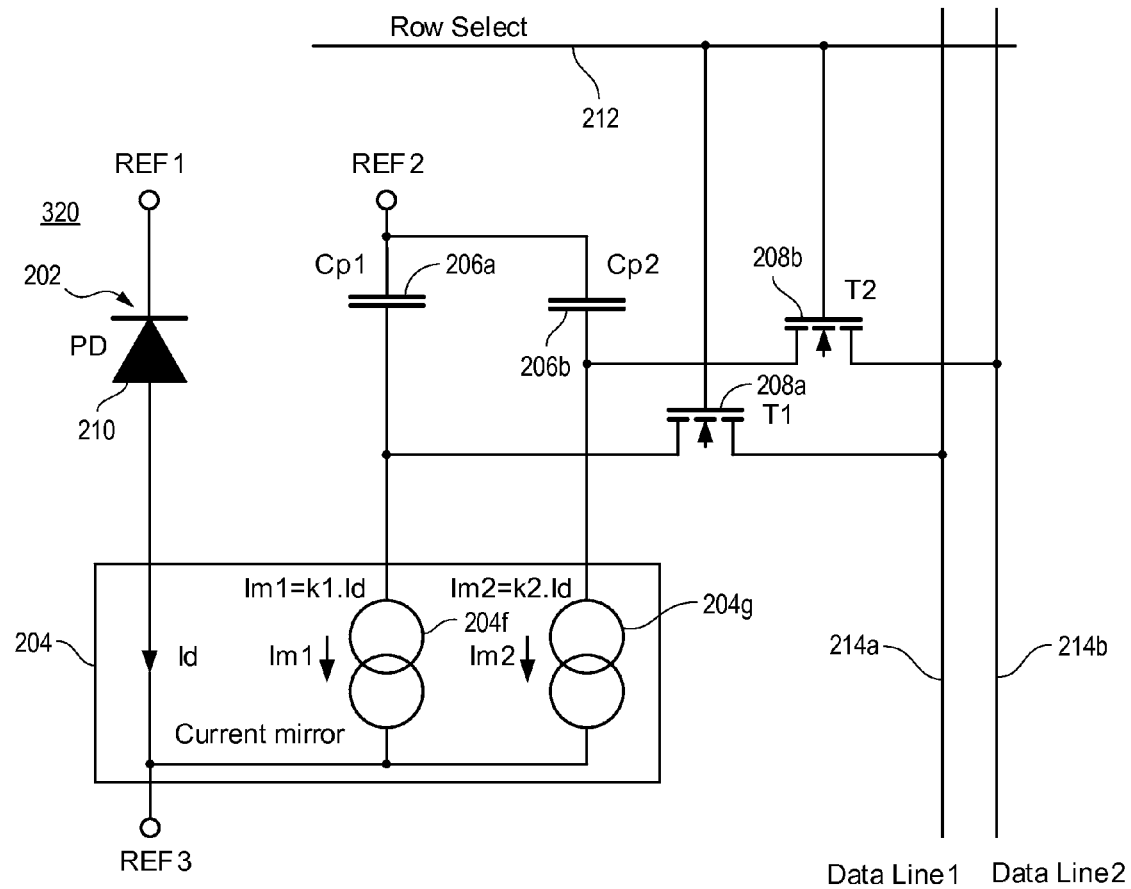
FIG. 15 illustrates a pixel architecture including two current mirrors and two storage capacitors according to some embodiments of this disclosure.

FIG. 15 illustrates an electrical circuit of a detector pixel 320 according to some alternative embodiments of this disclosure. In comparison with the detector pixel 200 shown in FIG. 5, the detector pixel 320 shown in FIG. 15 includes two current mirrors 204f, 204g, and two storage capacitors 206a, 206b, each coupled to one of the two current mirrors 204f, 204g. Each of the two storage capacitors 206a, 206b, can be accessed via one of switching transistors 208a, 208b. It should be noted that more than two current mirrors and more than two storage capacitors may be used and the embodiment shown in FIG. 15 is not limited to the number of current mirrors and storage capacitors. As shown, the first current mirror 204f, may be configured to have a first gain factor k1 and the second current mirror 204g, may be configured to have a second gain factor k2. The input current $I_d$, from the photodiode 210 may be gained by k1 time by the first current mirror 204f, and the gained current $I_m1$ may be integrated on the first storage capacitor 206a. The input current $I_d$, may be gained by the second current mirror 204g, by k2 time and the gained current $1_m2$ may be integrated on the second storage capacitor 206b. The gained current stored on the first and second capacitors 206a, 206b, may be read out in parallel using the first transistor 208a, and the second transistor 208b, to two external charge amplifiers (not shown) through two data lines 214a, 214b. Therefore, a same row select line 212 may be used to address two transistors 208a, 208b, which may be connected to two different data lines 214a, 214b, driving two charge amplifiers respectively. The signals on the two storage capacitors 206a, 206b, can be read out simultaneously with different gains k1 and k2 via data lines 214a, and 214b.

Figure 16:
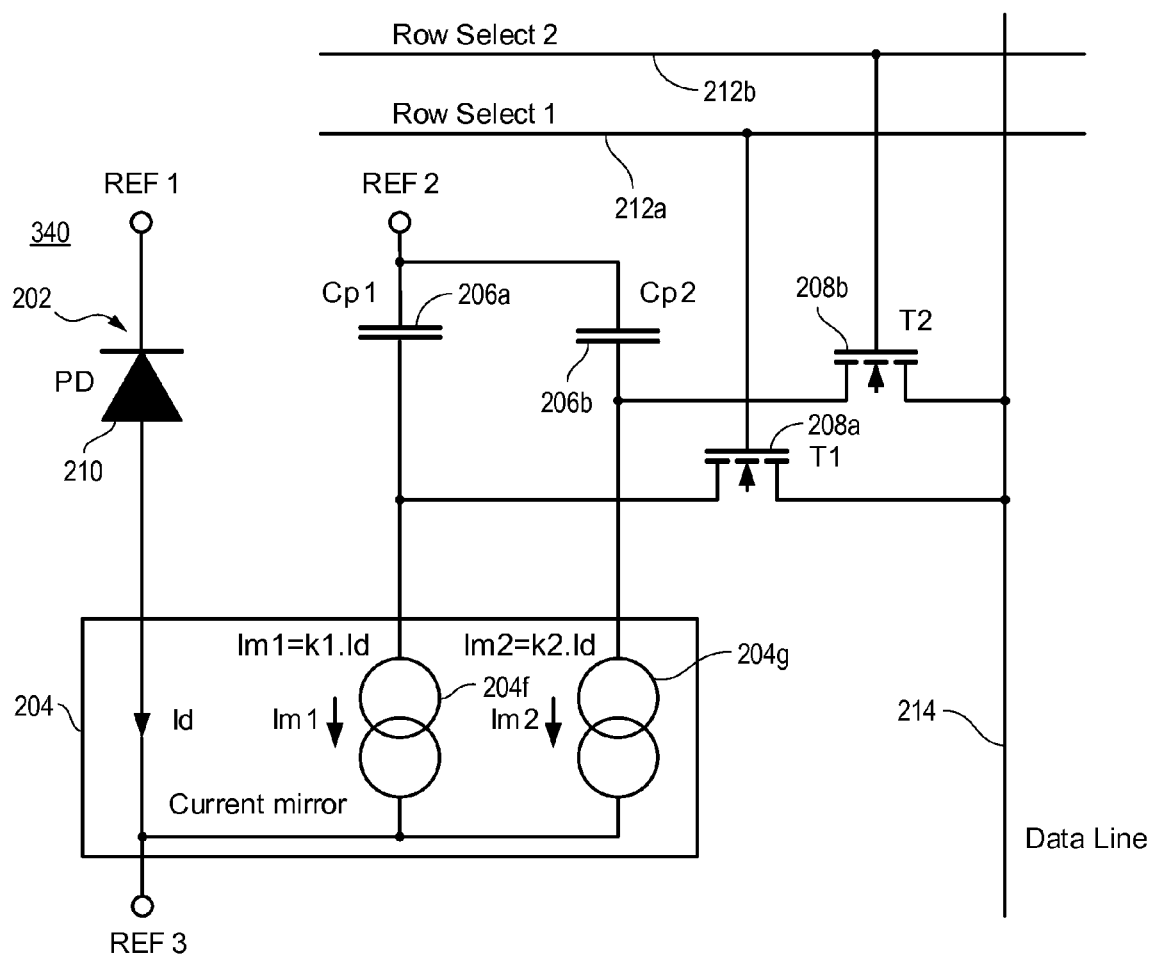
FIG. 16 illustrates a pixel architecture including two current mirrors and two storage capacitors according to some embodiments of this disclosure.

FIG. 16 illustrates an electrical circuit of a detector pixel 340 according to some alternative embodiments of this disclosure. The detector pixel 340 shown in FIG. 16 is a variation of the detector pixel 320 of FIG. 15. In FIG. 16, the first and second switching transistors 208a, 208b, are controlled by two different row select lines 212a, 212b, and connected to a same external charge amplifier (not shown) via a same data line 214. The signals on the first and second storage capacitors 206a, 206b, can be read out sequentially via the same data line 214 by sequentially select the two transistors 208a, 208b, via two row select lines 212a, 212b.

The pixel architectures 320, 340 shown in FIGS. 15 and 16 use two current mirrors or a current mirror with two output nodes having different gains to the input current. One of the advantages of the pixel architectures 320, 340 is that they allow for simultaneous high signal gain for better noise performance at low signal and low gain to extend the maximum signal that can be applied to the pixel before it saturates. This increases the dynamic range of the imager, which is an important parameter in some applications. The two storage capacitors may be readout simultaneously to separate amplifiers via different data lines or sequentially to the same amplifier via the same data line.

Figure 17:
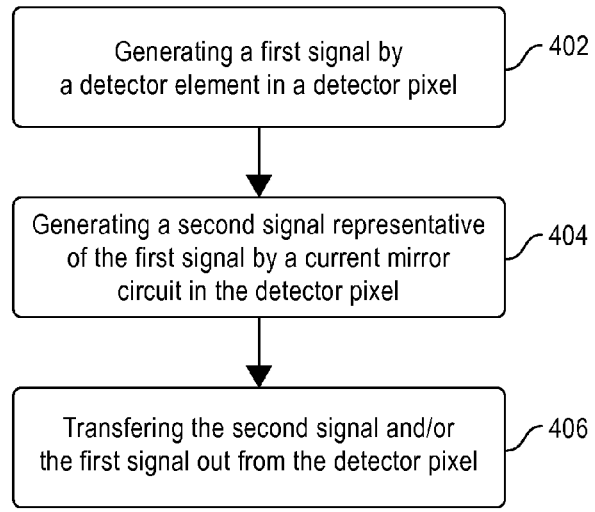
FIG. 17 is a flow chart illustrating an imaging method according to some embodiments of the disclosure.

FIG. 17 is a flow chart illustrating an imaging method according to embodiments of the disclosure. In the method, a first signal is generated by a detector element in a detector pixel in response to x-ray photons incident on the detector element (step 402). A second signal representative of the first signal is generated by a current mirror in the detector pixel when the detector pixel is selected by a switching transistor (step 404). The combined second signal and the first signal are transferred out from the detector pixel via the switching transistor (step 406). Alternatively, the first signal is transferred out from the detector pixel without gain (step 406).

Figure 18:
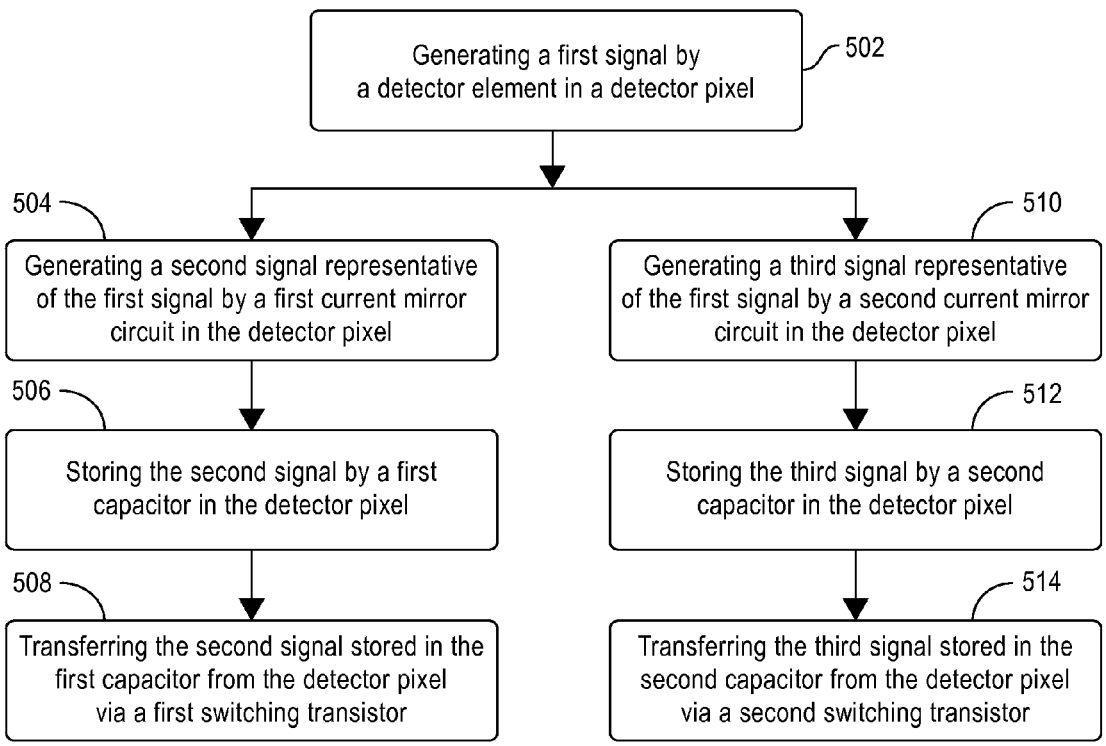
FIG. 18 is a flow chart illustrating an imaging method according to some other embodiments of the disclosure.

FIG. 18 is a flow chart illustrating an imaging method according to some other embodiments of the disclosure. In the method, a first signal is generated by a detector element in a detector pixel in response to x-ray photons incident on the detector element (step 502). A second signal representative of the first signal is generated by a first current mirror in the detector pixel (step 504) and stored on a first capacitor in the detector pixel (step 506). The second signal stored on the first capacitor is transferred from the detector pixel via a first switching transistor (step 508).

In some embodiments, a third signal representative of the first signal is generated by a second current mirror in the detector pixel (step 510) and stored on a second capacitor in the detector pixel (step 512). The third signal stored on the second capacitor is transferred from the detector pixel via a second switching transistor (step 514). The third and second signals may be transferred simultaneously from the detector pixel via the first and second switching transistors respectively. Alternatively, the third and second signals may be transferred sequentially from the detector pixel via the first and second switching transistors respectively.

Those skilled in the art will appreciate that various other modifications may be made within the spirit and scope of the invention. All these or other variations and modifications are contemplated by the inventors and within the scope of the invention.

What is claimed is:

1. An imaging apparatus comprising a plurality of detector pixels, wherein each detector pixel comprises:
   a detector element configured to generate a first current in response to x-ray photons incident thereon;
   a current mirror configured to generate a second current representative of the first current;
   a switching transistor configured to allow the second current and/or the first current to be transferred out from the detector pixel; and
   a switch controllable by a global select signal and connected to the current mirror, wherein when the switch is turned on, the first and second currents are transferred out from the detector pixel, and when the switch is turned off, the first current is transferred out from the detector pixel.

2. The imaging apparatus of claim 1 wherein the detector element comprises a photoconductor material configured to convert x-ray photons directly to electron-hole charges.

3. The imaging apparatus of claim 1 wherein the detector element comprises a scintillator material configured to convert x-ray photons to light and a photosensitive element configured to convert light to electrical charges.

4. The imaging apparatus of claim 3 wherein the photosensitive element comprises a photodiode.

5. The imaging apparatus of claim 1 wherein the plurality of detector pixels comprises continuous photodiodes.

6. The imaging apparatus of claim 1 wherein the switching transistor comprises a thin film transistor.

7. The imaging apparatus of claim 1 wherein the switching transistor comprises a CMOS transistor.

8. An imaging apparatus comprising a plurality of detector pixels, wherein each detector pixel comprises:
a detector element configured to generate a first current in response to x-ray photons incident thereon;
a first current mirror configured to generate a second current representative of the first current;
a first capacitor configured to accumulate charge from the second current; and
a first switching transistor directly coupled to the first capacitor and configured to allow the accumulated charge to be transferred out from the detector pixel.

9. The imaging apparatus of claim 8 wherein the each detector pixel further comprises:
a second current mirror connected to the first current mirror circuit via a switch controllable by a global select signal such that when the switch is turned on, the first and second current mirrors collectively generate the second current, and when the switch is turned off the first current mirror generates the second current.

10. The imaging apparatus of claim 8 wherein the each detector pixel further comprises:
a second current mirror configured to generate a third current representative of the first current;
a second capacitor configured to accumulate charge from the third current; and
a second switching transistor configured to allow the accumulated charge on the second capacitor to be transferred out from the detector pixel.

11. The imaging apparatus of claim 10 wherein the first and the second switching transistors are respectively coupled to different charge amplifiers external to the detector pixel via different data lines.

12. The imaging apparatus of claim 10 wherein the first and the second switching transistors are selectable by different select lines and coupled to a same charge amplifier external to the detector pixel via a same data line.

13. The imaging apparatus of claim 8 further comprising a first current source coupled to an input of the first current mirror.

14. The imaging apparatus of claim 13 further comprising a second current source coupled to an output of the first current mirror.

15. The imaging apparatus of claim 8 wherein the detector element comprises a photoconductor material configured to convert x-ray photons directly to electron-hole charges.

16. The imaging apparatus of claim 8 wherein the detector element comprises a scintillator material configured to convert x-ray photons to light and a photosensitive element configured to convert light to electrical charges.

17. The imaging apparatus of claim 8 wherein the plurality of detector pixels comprises continuous photodiodes.

18. The imaging apparatus of claim 8 wherein the first switching transistor comprises a thin film transistor.

19. The imaging apparatus of claim 8 wherein the first switching transistor comprises a CMOS transistor.

20. An imaging apparatus comprising a plurality of imaging pixels, wherein each imaging pixel comprises a photosensitive element configured to produce a current, a current mirror configured to amplify the current, and a capacitor configured to accumulate charge from the amplified current, wherein the current mirror comprises:
a first current mirror configured to amplify the current with a first gain; and
a second current mirror configured to amplify the current with a second gain, and wherein the capacitor comprises:
a first capacitor configured to accumulate charge from the current with the first gain; and
a second capacitor configured to accumulate charge from the current with the second gain.

21. The imaging apparatus of claim 20 wherein the second current mirror is coupled to the first current mirror via a switch controllable by a global select signal such that when the switch is turned on, the first and second current mirrors collectively amplify the current, and when the switch is turned off the first current mirror amplify the current.

22. An imaging method comprising:
generating a first current by a detector element in a detector pixel in response to x-ray photons incident on the detector element;
generating a second current representative of the first current by a current mirror in the detector pixel; and
transferring the second current and/or the first current out from the detector pixel via a switching transistor,
wherein in transferring, a switch controllable by a global select signal is used to turn on or off the current mirror, wherein when the current mirror is on, the first and second currents are transferred out from the detector pixel, and when the current mirror is off, the first current is transferred out from the detector pixel.

23. The imaging method of claim 22 wherein the detector element comprises a photoconductor material configured to convert x-ray photons to electron-hole charges.

24. The imaging method of claim 22 wherein the detector element comprises a scintillator material configured to convert x-ray photons to light and a photosensitive element configured to convert light to electrical charges comprising the first current.

25. An imaging method comprising:
generating a first current by a detector element in a detector pixel in response to x-ray photons incident on the detector element;
generating a second current representative of the first current by a first current minor in the detector pixel;
accumulating charge from the second current by a first capacitor in the detector pixel; and
transferring the accumulated charge on the first capacitor from the detector pixel via a first switching transistor, wherein the first switching transistor is directly coupled to the first capacitor.

26. The imaging method of claim 25 further comprising:
generating a third current representative of the first current by a second current mirror in the detector pixel;
accumulating charge from the third current in a second capacitor in the detector pixel; and
transferring the accumulated charge on the second capacitor from the detector pixel via a second switching transistor.

27. The imaging method of claim 26 wherein the accumulated charges from the second and third currents are transferred simultaneously from the detector pixel via the first and second switching transistors respectively.

28. The imaging method of claim 26 wherein the accumulated charges from the second and third currents are transferred sequentially from the detector pixel via the first and second switching transistors respectively.

29. The imaging method of claim 25 wherein the detector element comprises a photoconductor material configured to convert x-ray photons directly to electron-hole charges.

30. The imaging method of claim 25 wherein the detector element comprises a scintillator material configured to convert x-ray photons to light and a photosensitive element configured to convert light to electrical charges.

* * * * *

UNITED STATES PATENT AND TRADEMARK OFFICE
CERTIFICATE OF CORRECTION

PATENT NO.        : 9,500,752 B2
APPLICATION NO.   : 14/474660
DATED             : November 22, 2016
INVENTOR(S)       : Ivan Mollov Page 1 of 1

It is certified that error appears in the above-identified patent and that said Letters Patent is hereby corrected as shown below:

In the Claims

In Claim 25 at Line 6, replace "minor" with -- mirror --.

Signed and Sealed this
Fourth Day of April, 2017

Michelle K. Lee
*Director of the United States Patent and Trademark Office*